United States Patent [19]

George

[11] 4,293,136
[45] Oct. 6, 1981

[54] ANODIZED SEAL NOSE FOR DAMPER

[75] Inventor: Larry T. George, Greenfield, Ind.

[73] Assignee: Wallace Murray Corporation, New York, N.Y.

[21] Appl. No.: 130,380

[22] Filed: Mar. 14, 1980

[51] Int. Cl.³ .......................... F16J 15/32; F16F 15/12
[52] U.S. Cl. ................................ 277/12; 277/DIG. 6; 277/153; 277/237 R; 74/574
[58] Field of Search ......... 74/574; 277/1, 12, DIG. 6, 277/138, 152, 153, 165, 236, 237, 216, 96.2

[56] References Cited

U.S. PATENT DOCUMENTS

| 1,850,683 | 3/1932 | Merrill | 277/DIG. 6 |
| 2,724,377 | 11/1955 | Nallinger | 74/574 X |
| 2,807,511 | 9/1957 | Fleming | 277/216 |
| 2,986,955 | 6/1961 | Herbenar | 74/574 |
| 3,545,770 | 12/1970 | Wheelock | 277/152 |
| 3,917,286 | 11/1975 | Loyd | 277/153 X |
| 4,178,811 | 12/1979 | Shepherd | 74/574 |

Primary Examiner—Robert S. Ward, Jr.
Attorney, Agent, or Firm—Thomas J. Greer, Jr.

[57] ABSTRACT

A hub construction for a torsional vibration damper. The hub is formed of aluminum to obtain the known damper performance advantages of a lower moment of inertia. The hub is coated with a Teflon anodized layer to (1) protect it from oxidation, to (2) prevent the formation of aluminum oxide particles at the elastomer-hub interface. The coating is of a surface roughness of 60-70 micro inches, being a roughness in excess of that recommended by seal manufacturers. Unexpectedly, the coating does not injure a seal used with the damper, thus yielding a third advantage.

6 Claims, 1 Drawing Figure

U.S. Patent    Oct. 6, 1981    4,293,136
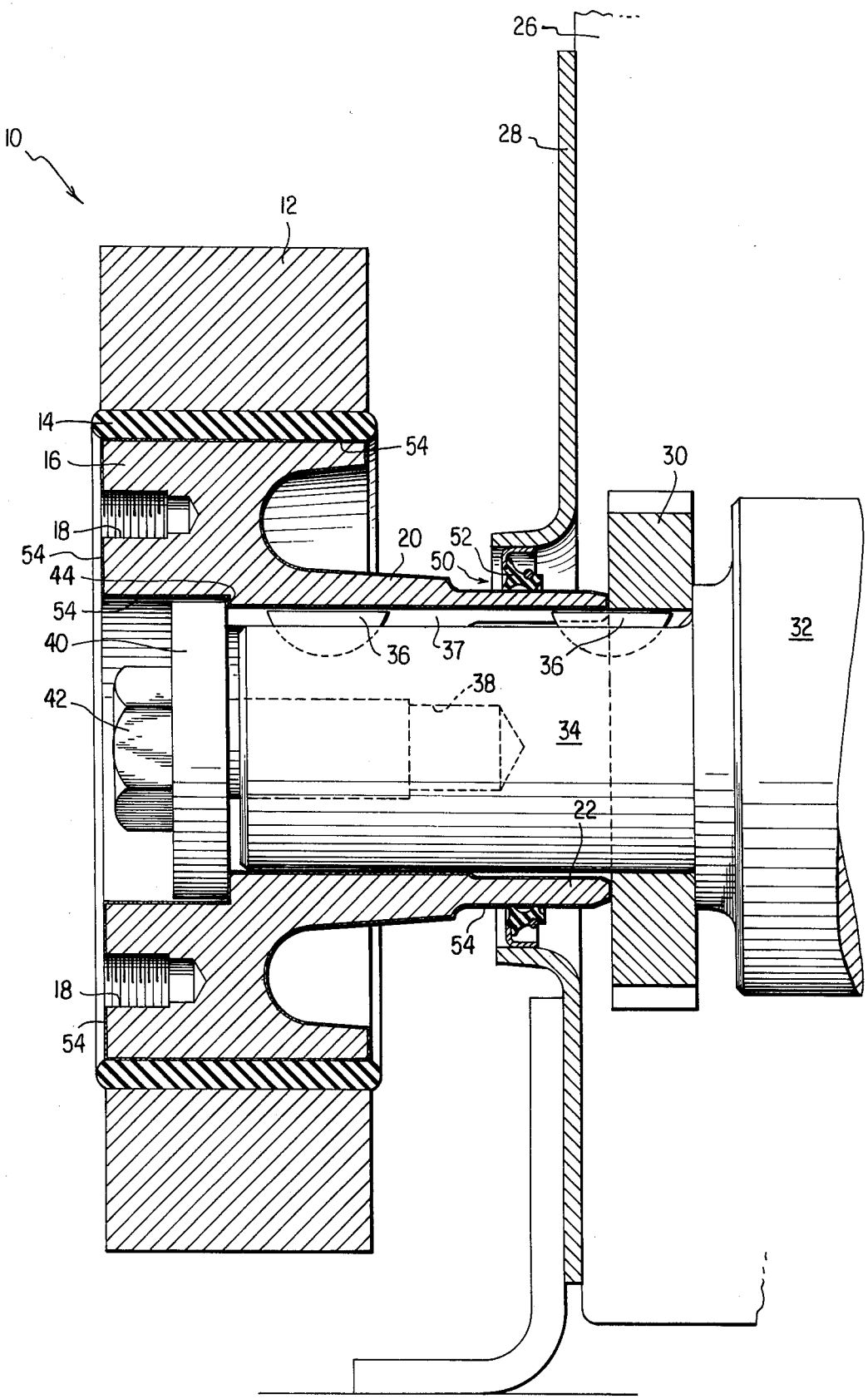

ANODIZED SEAL NOSE FOR DAMPER

The invention relates to the sealing art and more particularly to a rotary seal for the nose portion of the hub of a torsional vibration damper. Torsional vibration dampers are widely used in internal combustion engines. Typically, such a torsional vibration damper is placed at the front end of the crankshaft, at an elevation more or less with the junction of the top of the oil pan and near the bottom of the engine block. The front of the crankshaft passes through an oil seal, the crankshaft end carrying the torsional vibration damper. In certain installations, it is convenient to provide the hub of the torsional vibration damper with an axially extending portion, termed a nose portion. This portion extends somewhat into the engine block area, so that the rotary oil seal mounted in the engine block contacts the nose portion, instead of contacting the crankshaft.

In a typical prior art construction, the damper is formed of a cast iron hub and a cast iron inertia member, these elements being joined by an annular elastomer member. The mode of operation of such a torsional vibration damper is well known to those skilled in the art and accordingly will not here be set forth. In a prior art construction of this type, it has been customary to prepare the surface of the hub nose by machining its surface, usually of cast iron, to a surface roughness of between 10 and 20 micro inches. With surfaces smoother than this, the seal will have no lubrication, and thus the seal will wear away. For surfaces rougher than this, it has been found that the elastomer seal will be abraded or cut away. For example, in SAE Handbook for 1977, at page 28.41 under the entry "Transmissions", the prescription is given, for the shaft surface in a rotary seal installation, that "the surface roughness should be specified as 10-20 micro inches." The publication, "Oil Seals", Sec. R, revision 1964, published by Chicago Rawhide Manufacturing Company, at page S6, contains the statement that "the surface finish of the shaft over the area of seal contact should preferably be 10 to 20 RMS, with the lower limit being preferred for high speed." In the "Bearing Technical Journal" published by FMC at chapter 6 under the title "Sealing" the statement appears that "for effective application of lip-type contact seals, the shaft surface finish should be 10 to 20 AA." In "Machine Design" for June 30, 1977, at page 264, in discussing radial lip seals (a rotary shaft seal) the statement appears that the shaft for such a seal "should have a surface finish of 10 to 20 $\mu$in."

With the present need for greater automotive vehicle fuel efficiency, designers have turned whenever possible to lighter materials, such as aluminum, for many engine components. However, aluminum is an extremely soft metal relative to cast iron and would be unsuitable for mere direct substitution of material for cast iron in the hub of a torsional vibration damper. The elastomer or other type seal lip, often spring compressed, would cause excessive wear on the relatively soft aluminum nose of the damper hub.

One scheme for obtaining the benefits of a damper hub formed of a lighter weight material, such as aluminum, while overcoming the problem of wear, has been to provide the nose of the hub with a steel or other hard metal sleeve. The sleeve is prepared to a surface roughness in accordance with prior art teachings, and the seal bears against the sleeve. While overcoming the problem of hub nose wear, this solution requires the separate manufacture and surface finishing of a metal sleeve, as well as the additional manufacturing step of fastening and aligning the sleeve on the hub nose.

According to the practice of this invention, it has been found that aluminum, with its desirable lower weight, may be substituted for cast iron as a material of construction of the hub of a torsional vibration damper, provided that the surface of the aluminum is suitably coated to increase its hardness (wear resistance). However, such a substitution, i.e., surface coated aluminum for cast iron, carries with it the apparent disadvantage that the surface roughness of the coated aluminum, according to the surface coating process employed (to be later described), is in the range of 60-70 micro inches. Such surface roughness is substantially in excess of the range 10-20 micro inches deemed necessary by workers in this art. Hence, it would initially appear that the substitution of such a coated aluminum surface for cast iron could not be made because of this increased surface roughness. It has been observed that, unexpectedly, this rougher hub nose surface will not degrade the elastomer seal.

Yet another advantage exhibited by the practice of this invention also relates to the substitution of aluminum as the material for the hub of an otherwise conventional torsional vibration damper of this type. Prior attempts to utilize aluminum for the hub have resulted in the formation of a layer of aluminum oxide at the interface between the radially innermost portion of the elastomer of the damper and the radially outermost portion of the hub. The mechanism of formation of the aluminum oxide is believed to be as follows. Due to the action of humidity in the air, or the presence of water due to rain or from a vehicle washing apparatus, as well as salt water occasioned by splashing when transversing roads treated with salt during periods of ice and snow, aluminum oxide will initially form at both axial faces of the damper at the interface between the elastomer and the hub. After formation of a relatively small amount of aluminum oxide, the action continues. The aluminum oxide formation travels axially towards the center of the damper, until finally most if not all of the radially outermost surface of the aluminum damper is coated with aluminum oxide. It is known that aluminum oxide particles are extremely hard. Aluminum oxide is often used, for example, as an abradant, such as on abradant cloths and abradant papers for polishing. Now it is known that in a torsional vibration damper of this type the elastomer undergoes flexing due to inertia forces. There is thus a tendency for there to exist relative rotation between the hub and the elastomer member. If aluminum oxide particles are at the interface of these two members, then the action necessarily results in abrasion. The innermost surface of the elastomer ring thus becomes degraded by the rubbing action of the hard aluminum oxide particles. However, by the practice of this invention, it has been found that by coating the surface of the hub where it contacts the elastomer, the formation of aluminum oxide is prevented. Thus, a damper having an aluminum hub fashioned according to the practice of this invention will exhibit longer elastomer life.

Yet a third advantage of the practice of this invention results from the protection of all of the exposed surfaces of the aluminum hub to ambient by the coating. This will prevent pitting and other degradation of the hub surface. In practice, it is found more convenient to coat the entire surface of the aluminum hub, as opposed to coating only portions of such surface. Thus, the practice of this invention yields three advantages, protection of the entire surface of the hub, prevention of the formation of aluminum oxide at the elastomer-aluminum hub interface, and the non-degradation of the rubber shaft seal by the (anodized solid lubricant) coated surface which has a roughness in excess of that recommended by seal manufacturers.

Referring now to the drawing, the numeral 10 denotes generally a torsional vibration damper of generally conventional configuration and whose hub nose is provided with a coating according to this invention. The numeral 12 denotes an inertia ring, usually of cast iron, whose inner periphery is secured to the outer periphery by an elastomer band or ring 14. The inner periphery of elastomer ring 14 contacts the outer periphery of a hub member 16. The hub member, conventionally, is formed of cast iron although in the case of this invention, it is formed of the lighter metal, aluminum. The numeral 18 denotes conventional apertures in one face of the hub for attachment of accessory drive pulleys. The numeral 20 denotes an axially extending projection of hub 16, the projection terminating in a nose portion 22. The numeral 26 schematically denotes an internal combustion engine, while the numeral 28 denotes a front cover for the engine having the indicated opening therein. The numeral 30 denotes a timing gear mounted on a reduced diameter portion 34 of engine crankshaft 32. The numeral 36 denotes either one of two keys positioned in a keyway 37 of hub extension 20 for non-rotatably securing the crankshaft to the torsional vibration damper 10. The numeral 40 denotes a washer, one face of which abuts a portion 44 of reduced diameter in a central cavity in hub 16, bolt 42 passing through washer 40 and into threaded recess 38 in portion 34 of crankshaft 32. The numeral 50 denotes a conventional seal, here shown as defined by an annular elastomer seal member 52 compressed by an annular spring member and mounted in a bushing, the seal engaging the annular surface of nose portion 22, the seal member 52 resiliently and radially inwardly bearing against the shaft portion of nose 20.

According to the practice of this invention, the hub 16 is formed of aluminum coated in a specific manner. Aluminum, as noted previously, is a relatively soft metal and would, without more, be unsatisfactory as a material of construction for the hub 16. The nose portion 22 would become distorted by wear due to the rubbing contact of its outer surface with the elastomer 52 of seal 50. By the practice of this invention, a coating 54 is placed on the hub. The coating is made by anodizing, on the hub 16, solid lubricant particles, such as Teflon particles. The surface roughness of coating 54 is in the range of 60–70 micro inches, a range which has been determined by tests.

Thus, in distinction to the admonitions of those skilled in the seal art, as exemplified by the earlier noted statements regarding surface roughness of shafts which are to be used with rotary seals, the surface coating 54 will not cause a degradation or injury to the elastomer 52 of seal 50 in spite of the surface roughness of 60–70 micro inches, which roughness is beyond the recommended range of 10–20 micro inches.

Hub 16 is coated by Nimet Industries, Inc., South Bend, Indiana and West Springfield, Massachusetts. The coating is a Teflon (polytetrafluoroethylene) impregnated anodized coating. However, the method of coating is not a critical part of the present invention. Other methods of coating may be employed, such as that described in U.S. Pat. Nos. 3,567,597 and 3,808,111 issued to Hovey and Khan, which describe coatings of and methods of applying a coating having Teflon incorporated therein.

It is claimed:

1. A seal construction for a rotating hub nose seal for the nose of the hub of a torsional vibration damper of the type having an outer inertia ring, a radially intermediate elastomer member, and an innermost hub member, the seal being of the type including an elastomer seal lip having a portion surrounding and being in surface engagement with the hub nose at an axial portion of the hub, the improvement comprising, the hub being formed of aluminum, the hub nose having an anodized solid lubricant coating at least at its surface of contact with the said elastomer seal lip, the said coated hub nose having a surface roughness in the range of 60–70 micro inches, whereby the rotary seal between the elastomer seal lip and the rotating hub nose functions in a manner equivalent to a conventional rotating hub nose construction wherein the hub is formed of cast iron having an uncoated surface roughness in the range of 10–20 micro inches.

2. The seal construction of claim 1 wherein the solid lubricant particles are of a fluorocarbon polymer.

3. The seal construction of claim 2 wherein the solid lubricant particles are of polytetrafluoroethylene.

4. A torsional vibration damper of the type having an outer inertia ring, a radially intermediate elastomer member, and an innermost hub member, the improvement comprising, the hub being formed of aluminum, the hub having an anodized coating of a solid lubricant at least at the hub's radially outermost surface, which surface contacts the said elastomer to form an interface therewith, whereby the coating prevents the formation of aluminum oxide at the interface, which oxide would, if present, degrade the elastomer at the interface.

5. The seal construction of claim 4 wherein the solid lubricant particles are of a fluorocarbon polymer.

6. The seal construction of claim 5 wherein the solid lubricant particles are of polytetrafluoroethylene.

* * * * *